United States Patent [19]

Stanfill

[11] 4,009,907
[45] Mar. 1, 1977

[54] BOTTOM DISCHARGE HOPPER SEAL

[75] Inventor: Gary Lee Stanfill, Bakersfield, Calif.

[73] Assignee: Midway Fishing Tool Co., Long Beach, Calif.

[22] Filed: Feb. 26, 1976

[21] Appl. No.: 661,484

[52] U.S. Cl. .................. 298/27; 105/240; 105/247; 105/282 A; 222/561

[51] Int. Cl.² .......................... B61D 7/04

[58] Field of Search ............ 214/17 B; 298/27, 28; 105/282 A, 247, 248, 249, 282 R, 240; 222/561

[56] References Cited

UNITED STATES PATENTS

| | | | |
|---|---|---|---|
| 2,020,880 | 11/1935 | Dietrichson | 105/282 A |
| 3,635,170 | 1/1972 | Chierici | 105/282 |
| 3,807,318 | 4/1974 | Chierici | 105/282 A |

Primary Examiner—Frank E. Werner
Attorney, Agent, or Firm—William C. Babcock

[57] ABSTRACT

A resilient seal that may be removably mounted on the downwardly and inwardly tapering bottom portion of a hopper that defines a discharge opening, to cooperate with a gate in the form of a slide plate that normally closes the discharge opening to prevent moisture or water entering the interior of the hopper through the discharge opening when the gate is in a closed position. When the hopper has a water-tight cover mounted thereon, the resilient seal cooperates with the hopper to define a confined space within the interior thereof that is substantially moisture-proof, and one in which granular material, such as rice that is adversely affected by moisture, may be transported or stored.

5 Claims, 5 Drawing Figures

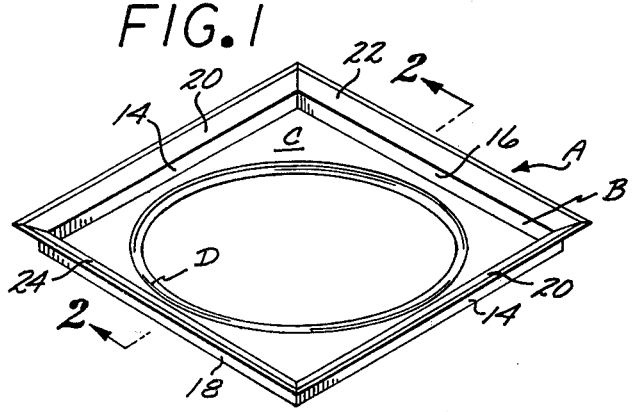
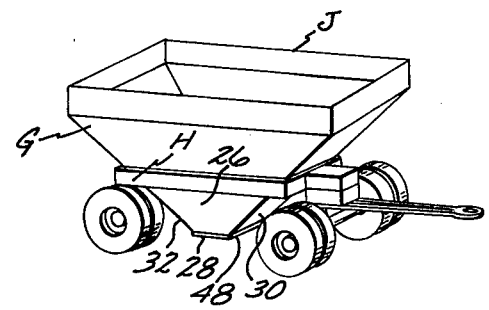
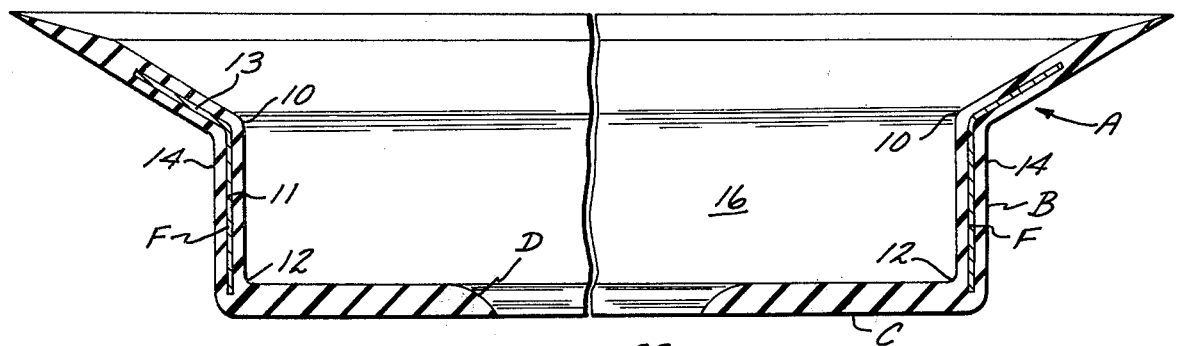
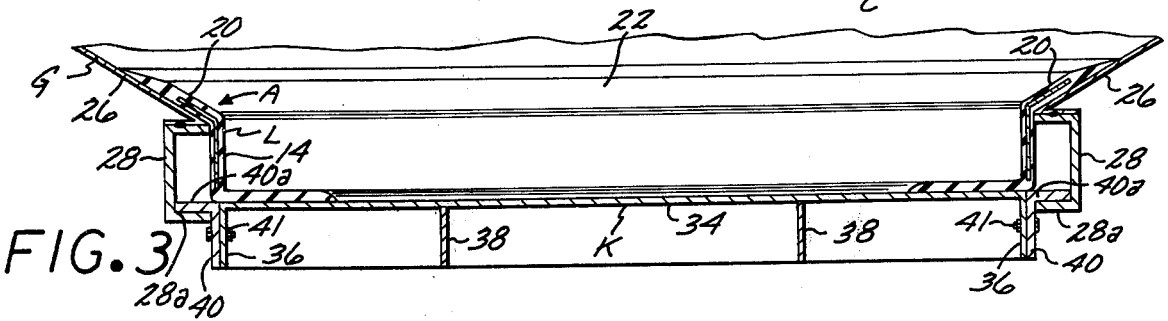
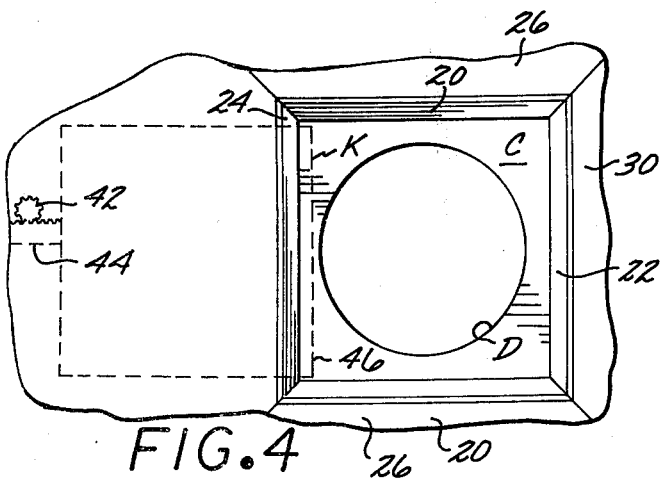
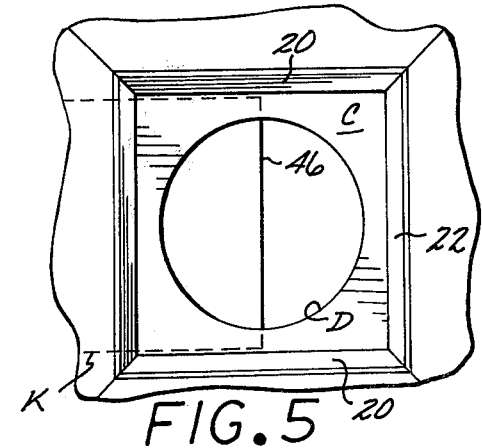

BOTTOM DISCHARGE HOPPER SEAL

BACKGROUND OF THE INVENTION

1. Field of the Invention

Bottom Discharge Hopper Seal.

2. Description of the Prior Art

Hoppers having downwardly and inwardly tapering bottom portions that define discharge openings are commonly mounted on wheel supported chassis for the transportation of granular materials. The discharge openings are normally closed by horizontal slide plates that act as gates to control the discharge of granular material from the hoppers when the gates are moved from closed to open or partially opened positions. Certain granular material such as rice, when stored or transported in hoppers of the above-described structure, are adversely affected from moisture or water that may pass from the ambient atmosphere to the interior of the hopper through spaces between the hoppers and the gate.

A major object of the present invention is to provide a resilient device that may be removably supported from the interior of a hopper and depend downwardly through the discharge opening therein to slidably contact the upper surface of the gate and effect an air-tight seal therewith.

Another object of the invention is to supply a resilient device that includes a horizontal web in which an opening is formed through which the granular material discharges when the gate is moved from a first closed position to any one of a number of second positions, with the web during discharge of granular material through the opening therein bowing downwardly due to the weight of granular material situated above the web, but the bowed web being returned to a horizontal position when the gate moves from any one of the second positions to a first position.

SUMMARY OF THE INVENTION

The present invention is used in combination with a hopper that is preferably mounted on a pneumatic tired wheel supported chassis, which hopper has a cover, and a lower portion defined by two laterally spaced side walls that taper inwardly towards one another, a forward rearwardly tapering side wall, and a rearward forwardly tapering side wall, which side walls at their lower extremities define a discharge opening through which granular material in the hopper may flow by gravity. The two side walls have two first guides of channel shape transverse cross-section depending therefrom. A rectangular slide plate that serves as a gate, and which plate is of greater length and width than that of said opening, is slidably supported in the two first guides, and the slide plate when in a first position completely closing the discharge opening. The slide plate, when in any one of a number of second positions allows discharge of granular material from the hopper downwardly through the discharge opening. The slide plate is preferably moved between first and second positions by power means of a conventional nature that are preferably supported on the chassis on which the hoppers are mounted.

The present invention for sealing the interior of a hopper from contact with the ambient atmosphere when the slide plate is in a first position includes a four-sided hollow frame of a resilient non-metallic material that snugly engages the discharge opening, with the resilient frame having upper and lower edges. Four flanges of resilient non-metallic material extend upwardly and outwardly from the upper edges of the resilient frame at substantially the same angles as the interior surfaces of the side walls that cooperate to define the discharge opening. The flanges are in abutting contact with the interior surfaces of the side wall and serve to support the frame in a depending position through the discharge opening, when the slide plate is moved from the first closed position to any one of a number of second positions. A horizontal resilient web of a non-metallic material is secured to the lower edges of the frame, and the frame of such depth that the web rests on the upper surface of the side plate when the latter is in the first position. The web has a centered opening therein through which granular material may discharge from the interior of the hopper as the slide plate is moved from the first to any one of the second positions. The frame and flanges have reinforcing means embedded within the interior thereof to prevent the flanges deforming and allowing the frame to move downwardly through the discharge opening when the web is subjected to a portion of the weight of granular material in the hopper when the slide plate is moved to a second position that permits discharge of the granular material through the opening in the web. When the web is subjected to the weight of the granular material in the hopper, as occurs when the slide plate is moved to any one of the second positions, the web tends to bow downwardly due to the weight of the granular material thereabove. This deformation of the web does not prevent the slide plate from being returned from a second to a first position, for as the slide plate moves to the second position it slidably contacts the bowed down portion of the web and returns the latter to a horizontal position where it rests on the upper surface of the slide plate.

A particular advantage of the present invention is the providing of a resilient seal for a discharge opening in a hopper, which hopper is normally closed by a slide plate, and the seal although deforming, does not prevent the operation of the slide plate in its customary manner.

BRIEF DESCRIPTION OF THE DRAWINGS

FIG. 1 is a perspective view of the resilient hopper bottom discharge opening seal;

FIG. 2 is a transverse cross-sectional view of the seal taken on the line 2—2 of FIG. 1;

FIG. 3 is a fragmentary transverse cross-sectional view of the lower portion of a hopper with a slide plate movably mounted thereon, and the seal in position in the hopper and slidably engaging the upper surface of the slide plate;

FIG. 4 is a top plan view of a portion of the discharge opening in the bottom of a hopper with the seal in place therein, and the slide plate moved to a substantially fully opened second position;

FIG. 5 is the same view as shown in FIG. 4, but with the slide plate moved to a second position for discharge of granular material from the hopper through substantially one half of the opening in the web of the resilient seal; and FIG. 6 is a perspective view of a hopper having a bottom discharge opening and slide plate with which the seal of the present invention may be used, and the hopper being mounted on a pneumatic tired wheel supported chassis.

DESCRIPTION OF THE PREFERRED EMBODIMENT

The sealing device invention A shown in FIGS. 1 and 2, is moulded as an integral unit from an elastomeric material such as rubber or the like, and includes a first rectangular frame B that has an upper edge 10 and a lower edge 12. The frame B is defined by a pair of laterally spaced parallel side walls 14, a forward side wall 16, and a rearward side wall 18. Two first flanges 20 extend upwardly and outwardly in opposite directions from the upper edges 10 of the side walls 14. A first forward flange 22 extends upwardly and forwardly from the forward side wall 16. A first rearward flange 24 extends upwardly and rearwardly from the upper edge 10 of the rearward side wall 18. A horizontal resilient web C extends between the lower edges 12 of the side walls 14, 16 and 18 as best seen in FIGS. 1 and 2. The web C has a discharge opening D therein which opening is illustrated as being of circular shape. A rigid reinforcing member F is embedded within the interior of the frame B and flanges 20, 22 and 24, which member is preferably formed from steel or like material. The reinforcing member F preferably includes a continuous rectangular second frame 11, that has second flanges 13 that extend from the upper edges thereof and are embedded in the first flanges 20, 22 and 24 previously identified. The purpose of the reinforcing member F is to prevent the first flanges 20, 22 and 24 deforming relative to the side walls 14, 16 and 18 from which they extend.

The resilient seal A is preferably used in conjunction with a hopper G that is mounted on a pneumatic tired wheel supported chassis H as may best be seen in FIG. 6, which hopper is provided with a cover J. Although the invention A is illustrated and described in connection with a hopper G that is movable, the invention A is equally adapted for use on a hopper that occupies a stationary position and is supported above the ground surface by conventional means such as legs or the like. The hopper G, as may best be seen in FIGS. 3 and 6, is defined by a pair of laterally spaced downwardly and inwardly extending walls 26 which walls on the lower extremity thereof support two laterally spaced, parallel channels 28. The hopper G includes a forward wall that extends downwardly and rearwardly, as well as a rearward wall that extends downwardly and forwardly. The walls 28, 30 and 32, at their lower extremity, define an opening L through which granular material (not shown) in the hopper G may discharge by gravity when the opening L is unobstructed.

A gate K is shown in FIGS. 3, 4 and 5, that includes a slide plate 34 that has two down-turned parallel laterally spaced edges 36, and a number of reinforcing members 38 disposed therebetween. The down turned edges 36 have two angle iron members 40 secured thereto by bolts 41 or other conventional fastening means. The channels 48 include inwardly extending flanges 28a that slidably support legs 40a of the angles 40, as best seen in FIG. 3. The chassis H supports a power driven sprocket 42 that engages a rack 44 as may best be seen in FIG. 4, which rack is secured to the gate K. By rotating the sprocket 42, the gate K may be moved longitudinally relative to the chassis H.

The gate K, when in a first position, has a forward transverse edge 46 thereof in abutting contact with a third channel 48 shown in FIG. 6 that extends between the forward ends of the pair of channels 28. The sealing device A is of such dimensions that it may be removably disposed within the interior of a hopper G, for the frame B thereof to extend downwardly through the opening L, with the flanges 20, 22 and 24 resting on the interior surfaces of the lower portion of the pair of walls 26, the wall 28 and the wall 30. When the sealing device A is so disposed, the web C thereof rests on the upper surface of the gate K, and the gate being longitudinally movable relative thereto and capable of occupying any one of a number of second positions, one of which second positions is shown in FIG. 4 and another of the second positions is illustrated in FIG. 5.

When the gate K is moved to the second position shown in FIG. 4, the discharge opening D is unobstructed, and granular material may flow downwardly from the hopper through the discharge opening D by gravity. The weight of the granular material in the hopper H will tend to bow the resilient web C downwardly when the gate K is in the second position shown in FIG. 4. However, this downward deformation of the web C does not prevent slidable movement of the gate K from the second position shown in FIG. 4 towards the second position illustrated in FIG. 5. As the gate K moves longitudinally to the right as viewed in FIGS. 4 and 5, the gate forces the portions of the web C adjacent the channels 28 upwardly into a horizontal position. The web C is in a completely horizontal position due to movement of the gate K when the gate completely obstructs downward flow of granular material through the discharge opening D. The web C, due to the weight of granular material thereabove, is at all times forced downwardly into sealing contact with the upper surface of the gate K, and as a result when the gate K is in the first position moisture or water is prevented from entering the interior confined space of the hopper G due to passing upwardly through the opening L.

The invention A is preferably molded as an integral unit from rubber or like elastomeric material, and with the rigid reinforcing member F situated within the interior thereof. The reinforcing member F is sufficiently rigid as to prevent the flanges 20, 22 and 24 deforming relative to the side walls 14, 16 and 18 to the extent that the invention A will be forced downwardly through the opening L when the weight of granular material in the hopper H is directed onto the web C when the gate K is in the second position shown in FIG. 4.

The invention has been described as being particularly useful in preventing the entry of liquid or moisture into the confined space in the hopper from the exterior of the latter. However, the invention is equally useful in preventing liquid originating in the confined space in the hopper, such as occurs when tomatoes are being hauled, from dripping downwardly onto a highway surface through the discharge opening. Granular material as used in the specification and claims is to be considered to not only include rice, grain and the like but also vegetables and fruit.

The use and operation of the invention has been explained previously in detail and need not be repeated.

I claim:

1. In combination with a rectangular hopper having a cover and a lower portion defined by two laterally spaced longitudinally extending walls that taper downwardly and inwardly towards one another, a forward wall that tapers downwardly and rearwardly, a rearward wall that tapers downwardly and forwardly, said walls at their lower extremities defining an opening through which granular material in said hopper may discharge by gravity, said longitudinally extending walls having two parallel guides of channel shape transverse cross section secured to the lower extremities thereof, a gate in the form of a rectangular plate slidably supported in said guides, said gate when in a first position completely closing said opening, said gate when in any one of a plurality of second positions allowing discharge of said granular material downwardly through at least a portion of said opening, means for sliding said gate longitudinally in said guides between said first position and any one of said second positions, a device for sealing and opening to prevent the entry of moisture or water therethrough when said gate is in said first position, said device including:

a. a four-sided hollow first frame of an elastomeric material that snugly engages said opening and extends downwardly therebelow, said first frame having upper and lower edges;

b. four first flanges of an elastomeric material that extend upwardly and outwardly from said upper edges of said first frame at substantially the same angle as the interior surfaces of said walls adjacent said opening, said first flanges in abutting contact with said surfaces and serving to support said first frame in said depending position through said opening when said gate is moved to one of said second positions;

c. a flat web of elastomeric material that extends between said lower edges of said first frame, said first frame of such depth that said web rests on said gate when the latter is in said first position, said web having a discharge opening therein through which said granular material in said hopper may discharge by gravity when said gate is in one of said second positions; and d. rigid reinforcing means embedded in said first frame and first flanges for preventing said first flanges being deformed relative to said first frame by the weight of said granular material on said web when said gate is in one of said second positions that said first frame, first flanges and web will be forced downwardly out of engagement with said hopper, said web due to the weight of said material thereon bowing downwardly when said gate is in one of said second positions, and said gate when it moves from one of said second positions to said first position slidably contacting the portions of said gate adjacent said guides on opposite sides of said discharge opening to force portions upwardly to horizontal positions where they rest on said gate; and the weight of said granular material in said hopper forcing said first flanges into sealing contact with the interior surfaces of said walls of said hopper and said web into sealing contact with said gate.

2. A device as defined in claim 1 in which said hopper is mounted on a wheel supported chassis.

3. A device as defined in claim 1 in which said frame, flanges and web are an integrally formed unit.

4. A device as defined in claim 1 in which said elastomeric material is rubber.

5. A device as defined in claim 1 in which said reinforcing means is a rigid four-sided metallic second frame that has four second flanges extending therefrom, said second frame and second flanges embedded in said first frame and first flanges.

* * * * *